(12) United States Patent
Carson

(10) Patent No.: US 8,144,558 B1
(45) Date of Patent: Mar. 27, 2012

(54) HIDDEN PATTERNS ON A DATA STORAGE MEDIUM

(75) Inventor: Douglas M. Carson, Cushing, OK (US)

(73) Assignee: Doug Carson & Associates, Inc., Cushing, OK (US)

( * ) Notice: Subject to any disclaimer, the term of this patent is extended or adjusted under 35 U.S.C. 154(b) by 1109 days.

(21) Appl. No.: 11/226,678

(22) Filed: Sep. 14, 2005

Related U.S. Application Data

(60) Provisional application No. 60/609,792, filed on Sep. 14, 2004.

(51) Int. Cl.
*G11B 7/00* (2006.01)
(52) U.S. Cl. .................. 369/53.21; 369/30.05
(58) Field of Classification Search ............... 369/47.12, 369/53.21, 275.3, 103, 47.75, 59.11, 59.12; 382/100; 430/17, 24, 321, 334, 336; 359/2; 380/51; 713/176
See application file for complete search history.

(56) References Cited

U.S. PATENT DOCUMENTS

| | | | |
|---|---|---|---|
| 4,967,286 A | 10/1990 | Nomula et al. | |
| 5,627,895 A | 5/1997 | Owaki | |
| 5,715,354 A | 2/1998 | Iwamura et al. | |
| 5,846,131 A | 12/1998 | Kitahara | |
| 5,949,752 A | 9/1999 | Glynn et al. | |
| 6,226,109 B1* | 5/2001 | Tompkin et al. | 359/2 |
| 6,252,685 B1* | 6/2001 | Yokochi | 359/2 |
| 6,320,829 B1* | 11/2001 | Matsumoto et al. | 369/47.12 |
| 6,423,478 B1* | 7/2002 | Ha | 430/321 |
| 6,469,969 B2 | 10/2002 | Carson et al. | |
| 6,477,124 B2 | 11/2002 | Carson | |
| 6,487,155 B1 | 11/2002 | Carson et al. | |
| 6,569,969 B2 | 5/2003 | Charmot et al. | |
| 6,608,911 B2* | 8/2003 | Lofgren et al. | 382/100 |
| 6,735,160 B1* | 5/2004 | Miyashita et al. | 369/59.12 |
| 6,754,158 B1* | 6/2004 | Kobayashi et al. | 369/59.11 |
| 6,862,033 B2 | 3/2005 | McClellan | |
| 7,131,007 B1 | 10/2006 | Johnston et al. | |
| 7,187,633 B2* | 3/2007 | Lehmann | 369/47.15 |
| 7,220,535 B2* | 5/2007 | Lawandy et al. | 430/336 |
| 7,257,234 B2* | 8/2007 | Kesal et al. | 382/100 |
| 7,305,104 B2 | 12/2007 | Carr et al. | |
| 7,366,301 B2* | 4/2008 | Huang et al. | 380/51 |
| 7,428,205 B2* | 9/2008 | Harding | 369/103 |
| 2008/0144459 A1* | 6/2008 | Selinfreund et al. | 369/53.2 |
| 2008/0212443 A1* | 9/2008 | Ando et al. | 369/83 |
| 2009/0003170 A1* | 1/2009 | Kondo | 369/53.21 |
| 2009/0003190 A1* | 1/2009 | Kondo | 369/275.4 |
| 2010/0034063 A1* | 2/2010 | Kondo | 369/47.1 |

* cited by examiner

*Primary Examiner* — Adam R Giesy
(74) *Attorney, Agent, or Firm* — Hall Estill Attorneys at Law

(57) ABSTRACT

Apparatus and method for providing hidden data to a data storage medium. The hidden data are written by selectively adjusting at least one access parameter of the medium, and preferably by selectively adjusting multiple such parameters. The presence of the hidden data is preferably undetectable to the human eye during unaided visual inspection of the medium, but is revealed by a surface plot of at least a portion of the medium. The surface plot preferably provides a human detectable image of the hidden data to authenticate the medium as an authorized copy. The medium preferably comprises a pre-recorded or recordable optical disc, or a glass master from which such discs are formed. The adjusted access parameter(s) preferably include adjustments in motor velocity, data bit rate, latency time, adjusted symbol length, illegal symbol length, localized reflectivity of the medium, variations in pre-groove amplitude, error rates, and/or localized induced errors.

28 Claims, 6 Drawing Sheets

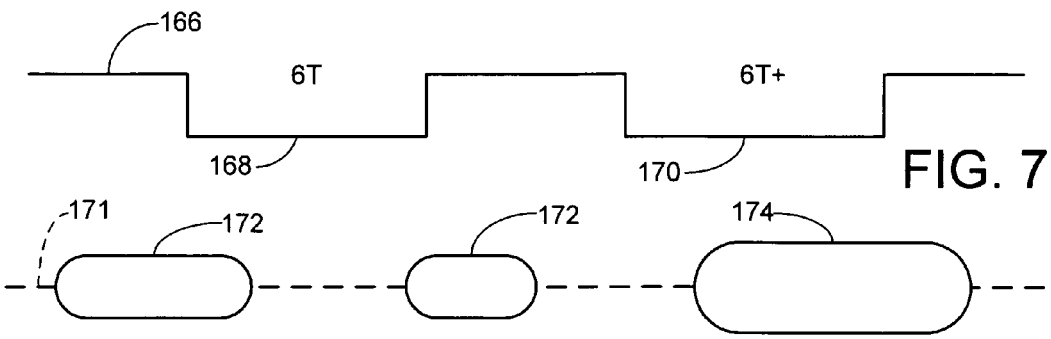
FIG. 7
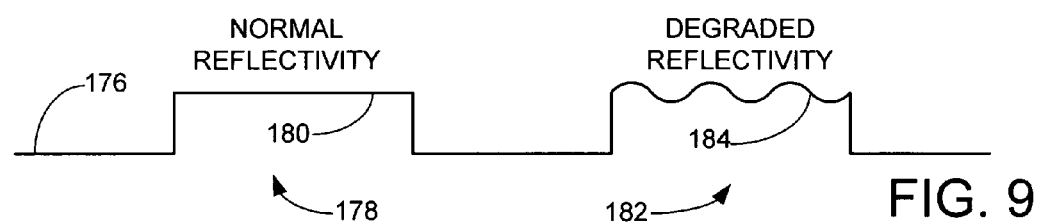
FIG. 8
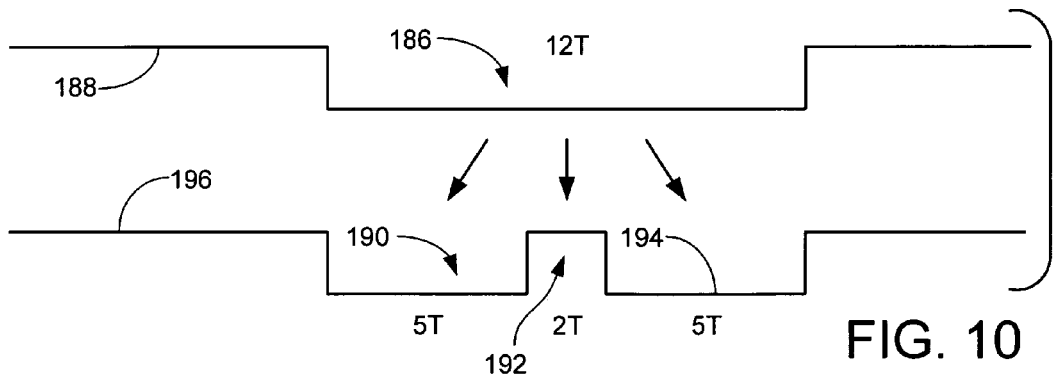
FIG. 9
FIG. 10
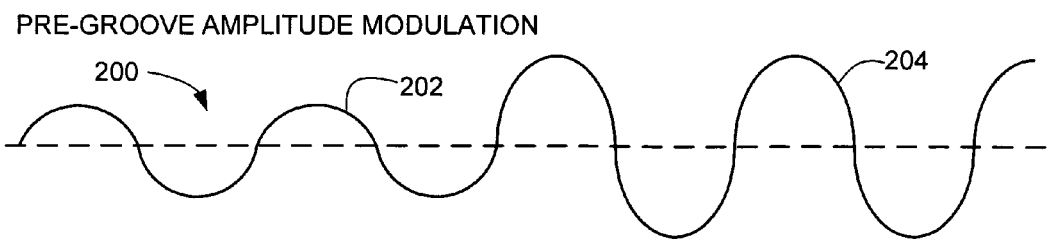
FIG. 11

HIDDEN PATTERNS ON A DATA STORAGE MEDIUM

RELATED APPLICATIONS

This application claims domestic priority under 35 U.S.C. §119(e) to U.S. Provisional Application No. 60/609,792 filed Sep. 14, 2004.

FIELD OF THE INVENTION

The present invention relates generally to the field of digital data storage and more particularly, but without limitation, to an apparatus and method for placing hidden patterns on a data storage medium, such as an optical disc, to authenticate the medium as an authorized copy.

BACKGROUND

Optical discs are a type of data storage media used to store a wide variety of digitally encoded data. Optical discs store data on one or more embedded layers. Data are transduced from an optical transducer which detects areas of different reflectivity ("pits and lands") in the layers. Generally, optical discs can be "pre-recorded" in which case the recording layer(s) are preformed during disc manufacturing; "recordable" in which case the recording layers are configured to accept recorded data (once or many times); or "hybrid," with both pre-recorded and recordable areas.

With the continued world-wide demand for content on optical discs and on other types of data storage media, there remains a continued need for improvements in the manner in which forensic data can be placed on a particular medium to determine whether the medium is an authorized copy.

SUMMARY OF THE INVENTION

Preferred embodiments of the present invention are generally directed to an apparatus and method for providing hidden data to a data storage medium.

In accordance with preferred embodiments, the hidden data are written by selectively adjusting at least one access parameter of the medium, and preferably by selectively adjusting a multiple number of such access parameters. The presence of the hidden data is preferably undetectable to the human eye during unaided visual inspection of the medium, but is readily revealed by a multi-dimensional (surface) plot of the medium. The surface plot preferably provides a human detectable image of the hidden data, and the presence of this image authenticates the medium as an authorized copy.

The medium preferably comprises a pre-recorded or recordable optical disc, or a glass master from which such replicated discs are formed. The access parameters preferably include adjustments in motor velocity, data bit rate, latency time, adjusted symbol length, illegal symbol length, localized reflectivity of the medium, variations in pre-groove amplitude, error rates, and/or localized induced errors.

The surface plot preferably comprises a multi-dimensional array of pixels displayed on a display device, such as a PC monitor or a hardcopy printout. Preferably, the image is formed as a composite of multiple adjusted parameters on the medium.

These and various other features and advantages of the presently claimed invention will become apparent upon a review of the following detailed description and associated drawings.

DESCRIPTION OF DRAWINGS

FIG. 7 represents a preferred use of adjusted symbol lengths to provide a human detectable image such as exemplified in FIG. 2.

FIG. 8 shows a preferred use of adjusted symbol widths to provide a human detectable image such as exemplified in FIG. 2.

FIG. 9 illustrates a preferred use of adjustments in symbol reflectivity to provide a human detectable image such as exemplified in FIG. 2.

FIG. 10 provides a preferred use of illegal symbols to provide a human detectable image such as exemplified in FIG. 2.

FIG. 11 illustrates a preferred use of pre-groove amplitude modulation to provide a human detectable image such as exemplified in FIG. 2.

DETAILED DESCRIPTION

As discussed in detail below, an apparatus and method are disclosed for placing hidden data on a data storage medium such as an optical disc. The hidden data are generally not detectable to the human eye upon a visual inspection of the medium. Rather, the hidden data are rendered visually detectable through the generation of a multi-dimensional plot based on one or more access parameters measured from the medium during a readback operation.

The plot is preferably displayed on a personal computer (PC) monitor, but can take other forms as well including on a hardcopy printout. The plot is preferably multi-colored (16.7 million colors, 256 colors, etc.), but can also be rendered in grey scale or in black and white (i.e., 2-color).

Preferred embodiments of the present invention are directed to single layer and multi-layer DVD optical discs (including DVD-R, DVD-R/W, DVD-Hybrid, etc.), but such is not limiting.

Figure 1:
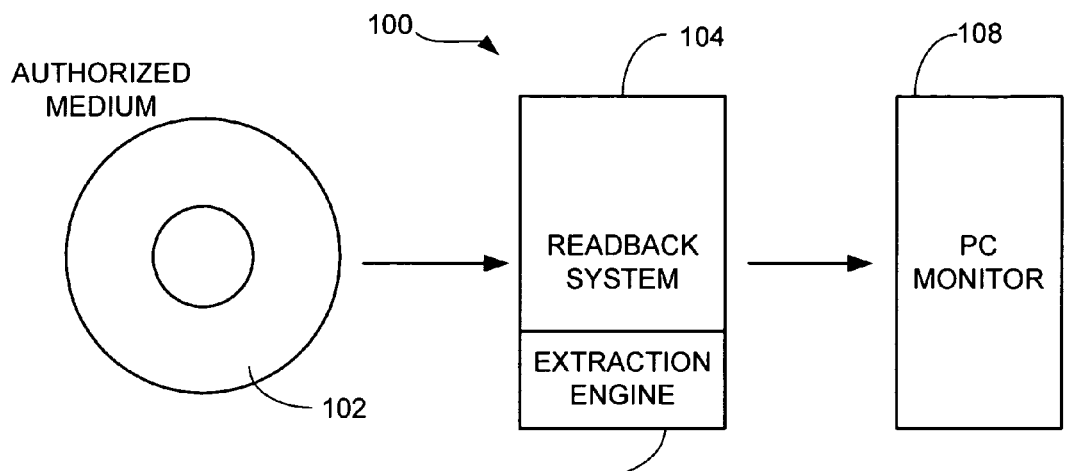
FIG. 1 provides a functional block diagram of a disc authentication system constructed and operated in accordance with preferred embodiments of the present invention.

FIG. 1 provides a simplified, functional block representation of a disc authentication system 100. Hidden data are written to an authorized medium 102 (in this case, a pre-recorded DVD-5 optical disc). As explained below, the hidden data are written by adjusting at least one access parameter of the medium 102.

A readback system 104 accesses the disc 102 and includes an extraction engine 106 which detects the access parameters, derives a surface plot of at least a portion of the surface of the disc, and displays the surface plot on a display device 108 (in this case, a PC monitor). An exemplary surface plot 110 on the monitor 108 is depicted in FIG. 2.

Figure 2:
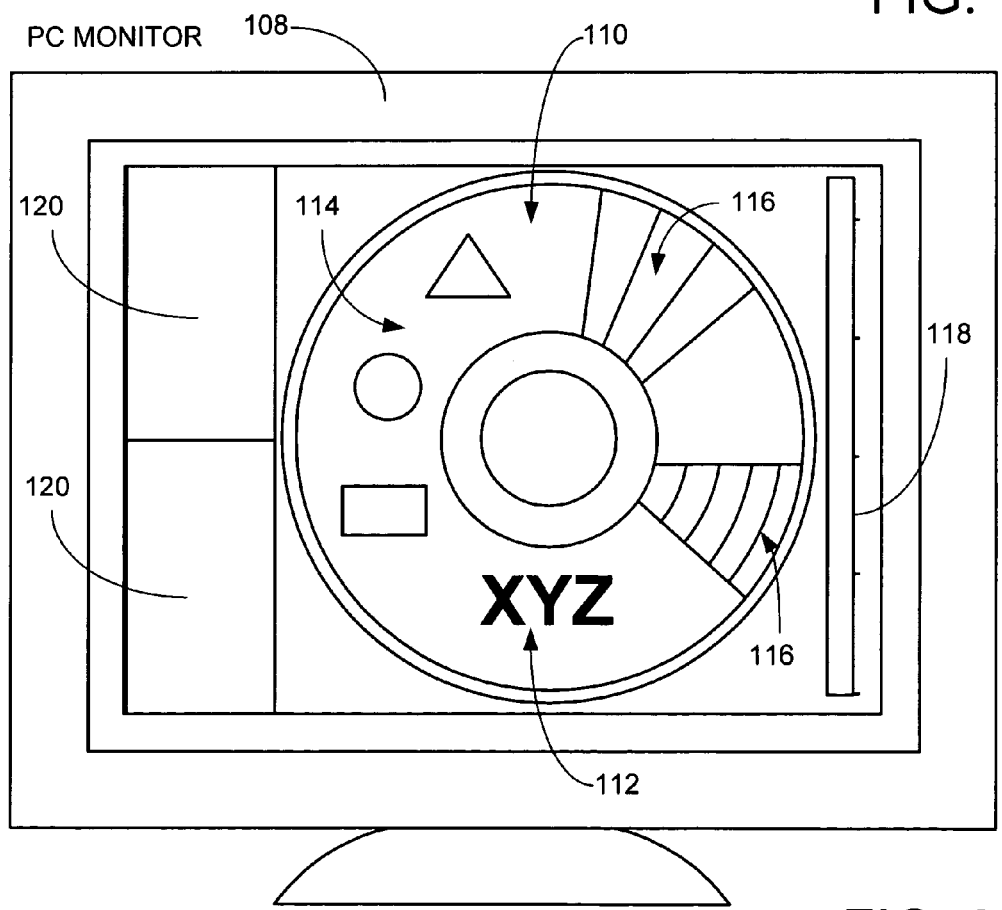
FIG. 2 shows a display device from the system of FIG. 1.

The surface plot 110 of FIG. 2 depicts the entire reading surface of the medium 102. The hidden data can be displayed in a number of forms, such as alphanumeric characters 112, geometric shapes 114, stripes (bands) of adjacent coloration 116, etc. Preferably, the surface plot 110 is rendered as a multi-color image (16.7 million colors). A gradation chart 118 can be used to provide a color/value cross-reference. Control windows 120 provide file, parameter or other process information to the user. Those skilled in the art will recognize that generating a bit map or similar image for an array of data points is relatively straightforward and can be carried out in a number of ways; in a preferred embodiment, a suitable commercially available graphics program such as Paint Shop Pro by Jasc Software, Inc., Eden Prairie, Minn., USA, is used to arrange and display the plot 110.

It will be noted at this point that the hidden data are generally undetectable to the human eye upon a visual inspection of the authorized medium 102, but the hidden data become readily visible to the human eye upon visual inspection of the surface plot 110 on the monitor 108 or other display device. The hidden data are preferably selected so as to not be reproducible on an unauthorized copy, allowing the presence or absence of the hidden data in the plot to indicate whether a particular copy is in fact an authorized copy. The hidden data can comprise a company logo, date code, revision or other production information, etc. to provide forensic tracking information to inspection personnel.

Figure 3:
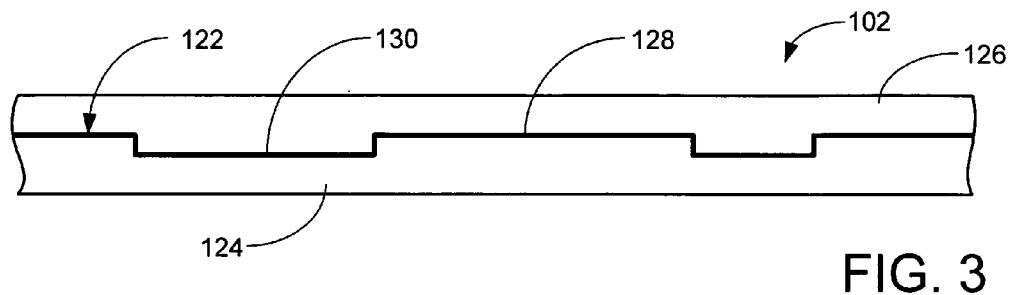
FIG. 3 is a simplified, elevational representation of a portion of a data storage medium evaluated by the system of FIG. 1.

FIG. 3 provides a simplified elevational, cross-sectional view of the disc 102. A single embedded recording layer 122 is encapsulated in opposing polycarbonate or similar protective layers 124, 126. The recording layer 122 stores data in the form of pits 128 and lands 130, each of which nominally provide a different reflectivity to a focused optical pick-up assembly (not shown). The lengths of the pits and lands are nominally selected to correspond to a selected symbol length range (e.g., 3T to 14T with T at a selected readback frequency).

Figure 4:
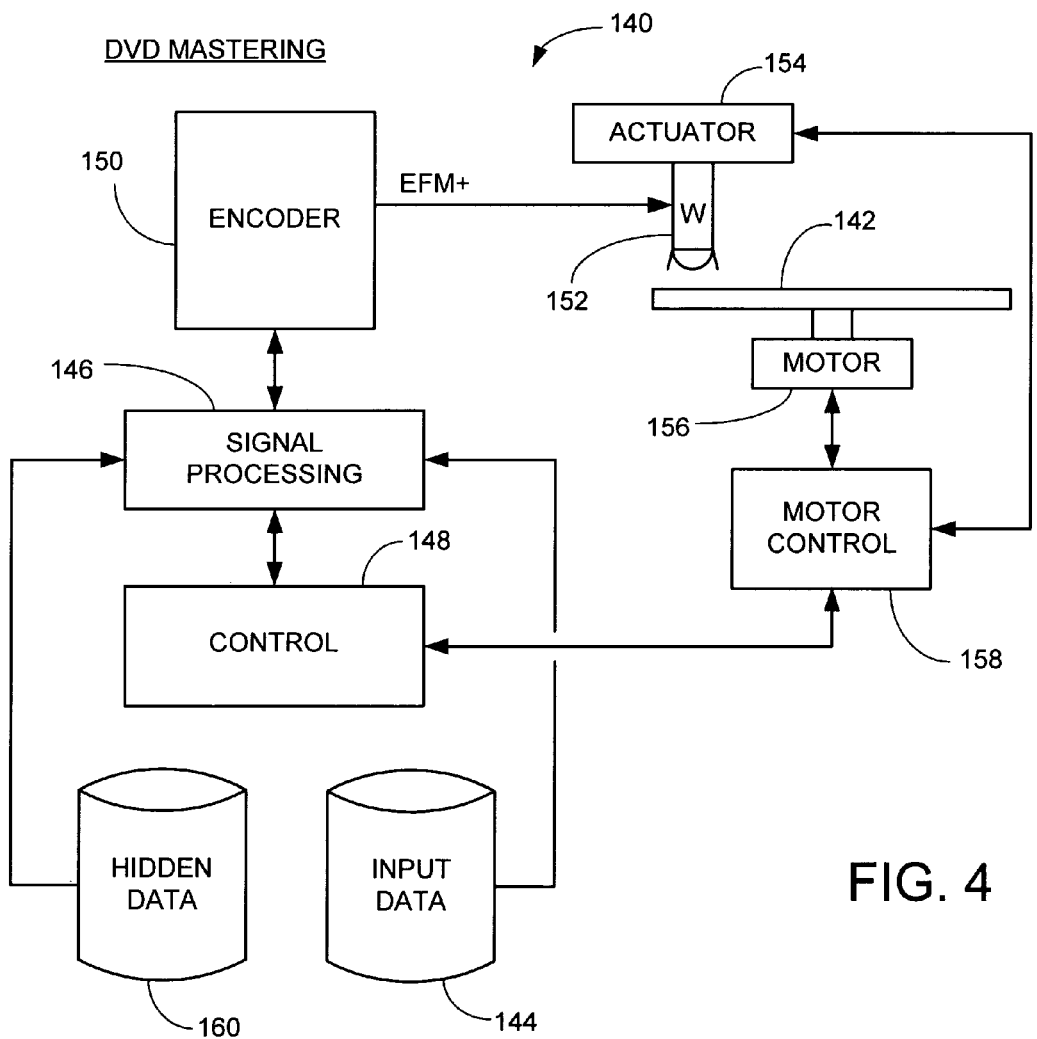
FIG. 4 shows a mastering system used in the formation of the medium of FIG. 3.

FIG. 4 provides a functional block diagram of a DVD mastering system 140 used to write the hidden data to the disc 102 of FIGS. 1 and 3. Preferably, the mastering system 140 selectively exposes a glass master disc 142 from which a series of stampers is generated. The stampers are subsequently used in an injection molding process to form a population of replica discs nominally identical to the disc 102.

Input data constituting the primary data to be stored to the disc 142 are provided from a source 144 to a signal processing block 146. The signal processing block 146 operates under the direction of a top-level control block 148 to provide the data to an encoder 150. For reference, the signal processing block 146, control block 148 and encoder 150 are collectively referred to herein as a "writing circuit."

The encoder 150 applies the appropriate encoding (such as 8/16 modulation) to produce an extended frequency modulation signal (EFM+) to a write transducer 152. The write transducer 152 selectively exposes a layer of photoresist on the glass master disc 142 to expose areas in relation to the transitions in the EFM+ signal.

The transducer 152 is selectively advanced across the radius of the disc 142 via actuator 154, while a motor 156 nominally rotates the glass master disc 142 at a constant linear velocity by motor control circuitry 158.

The signal processing block 146 preferably additionally receives the hidden data from a hidden data source 160. Depending upon the type of access parameters used to write the data to the disc 142 (and thus, to the resulting replicated disc 102), the hidden data are applied to the input data prior to or after the encoding by the encoder 150, or are induced in other ways such as by the selective operation of the control block 148, as will now be discussed.

Figure 5:
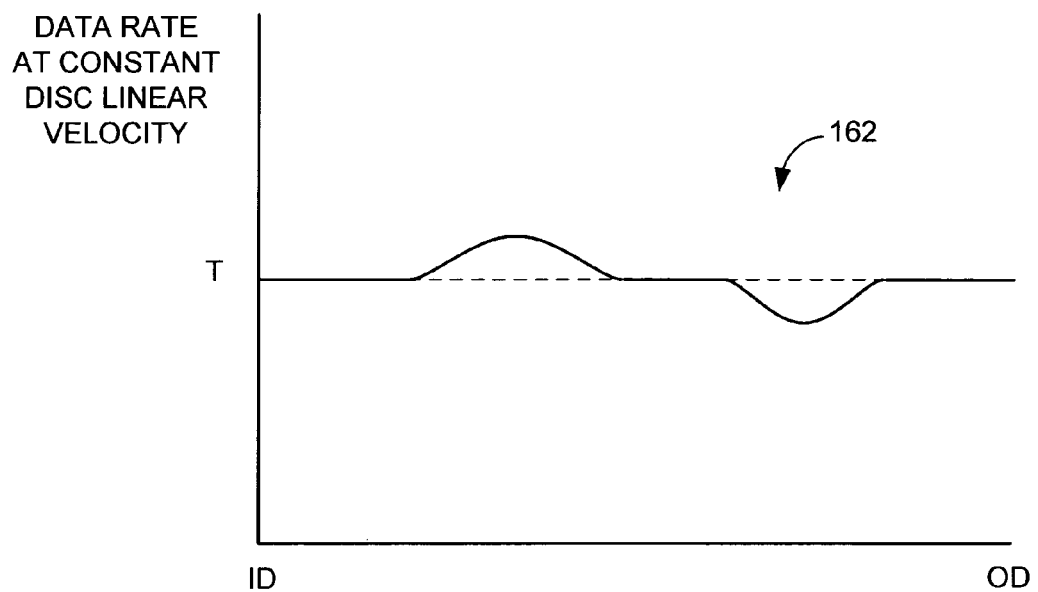
FIGS. 5 and 6 are generalized graphical representations of a preferred manner in which at least one access parameter of the medium is adjusted to provide a human detectable image such as exemplified in FIG. 2 in relation to localized variations in data bit rates of the medium.
Figure 6:
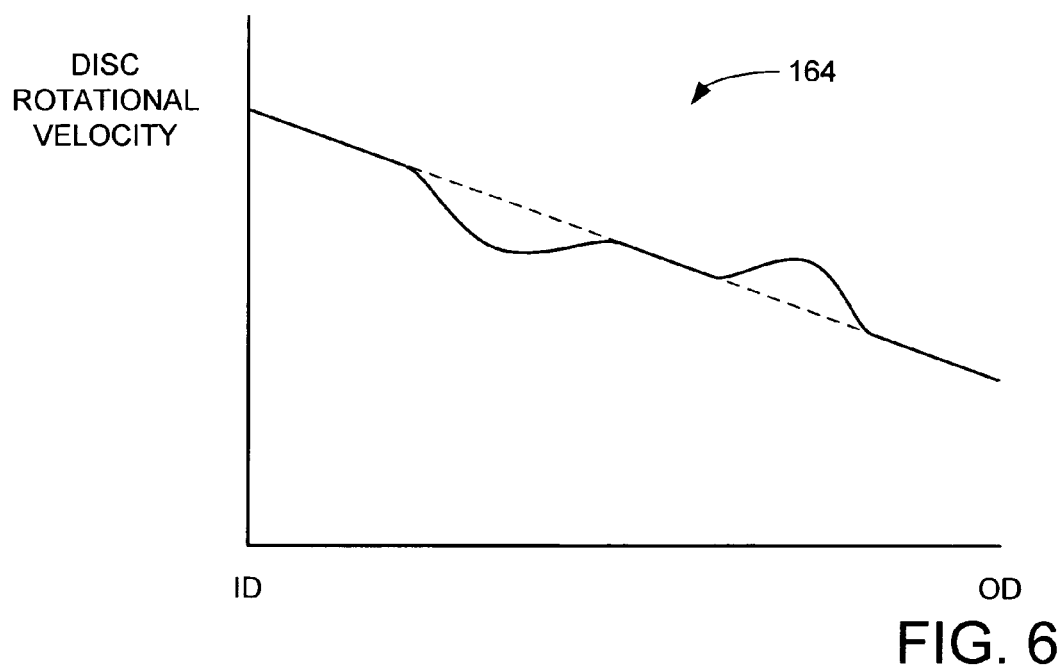

In a first embodiment, the access parameters used to express the hidden data displayed in FIG. 2 are provided in relation to different rates at which the data are written to the disc 102. FIGS. 5 and 6 provide graphical depictions of a data rate curve 162 and a motor speed curve 164 in accordance with this embodiment.

As disclosed in U.S. Pat. No. 6,477,124 assigned to the assignee of the present application, optical discs are often written at a constant linear velocity (CLV) so that all of the respective symbols on the disc are have nominally uniform sizes irrespective of radius (e.g., all the 3T symbols on the disc are nominally the same size, all the 4T symbols on the disc are nominally the same size, etc.).

During subsequent readback of the disc, a readback system motor (not shown) will speed up and slow down in order to attempt to maintain the readback frequency at a selected level. This normal operation is denoted by the linear broken lines (not numerically designated) in FIGS. 5 and 6.

However, by deliberately varying the write frequency, the motor velocity, or both during the data writing process, different data rates can be established across the disc, as exemplified by the variations provided in curves 162, 164 in FIGS. 5-6. This results in symbols having different symbol lengths at different locations on the disc.

Accordingly, in this first embodiment the system 140 of FIG. 2 adjusts the write frequency, the motor velocity, or both, to provide the data on the disc 102 with different data rates at different locations in accordance with an initial hidden data profile. During readback, the extraction engine 106 (FIG. 1) preferably monitors the velocity of the motor and assigns different colors in relation to the detected motor velocity speeds at different locations on the disc. The resulting contrasts in speed are reflected in the images visually detectable in the plot 110. It will be noted that the variations in motor speed (or other related parameters, such as access time or frequency), need not be drastic nor even out of spec.

In a second preferred embodiment, the hidden data are expressed in terms of adjusted symbol length. FIG. 7 provides a simplified diagram of a recording layer 166 with a 6T symbol of normal length at 168. Applying transition adjustment techniques such as disclosed in U.S. Pat. No. 6,469,969, assigned to the assignee of the present invention, an adjusted length 6T+ symbol at 170 can be provided with a slightly longer length as compared to the symbol 168. The same techniques can be used to provide symbols of slightly shorter length.

Such adjustments can be carried out in a number of ways, such as by adding a second encoder downstream from the first encoder which takes the nominal EFM+ output and then advances or delays individual pit-land transitions in relation to the hidden data to provide a modified EFM+ signal with the adjusted transitions that is then used to expose the master disc 142.

Accordingly, in this embodiment the extraction engine 106 (FIG. 1) monitors the readback signal for symbol length, detects those having non-standard lengths, and constructs the surface plot. The hidden data can be related to just those symbols with affected lengths, or more detailed graphics can be developed by assigning different colors to different adjusted symbols (i.e., 4T v. 8T), whether symbols are shortened or lengthened, etc.

A related embodiment is set forth by FIG. 8, which shows pit width modulation along a nominal track centerline 171. Pits 172 are provided with a "standard" width whereas pit 174 is provided with a larger width. This can be induced in a number of ways, including through selective adjustment of the power of the write transducer 152 (FIG. 4). As before, the extraction engine 106 monitors for variations in pit width and constructs the plot 110.

Another embodiment is exemplified by FIG. 9, which shows a recording layer 176 with a first symbol 178 having a nominal reflectivity due to a nominally flat reflective surface 180. A second symbol 182 of like type (e.g., a second pit) has a relatively degraded reflectivity due to a "waviness" induced in reflective surface 184. The waviness is preferably induced during the write process by adding a high frequency modulation signal to the EFM+ signal. In this way, during subsequent readback the second symbol 182 will provide a reflected power level that less than the reflective power level of the first symbol 180. The extraction engine 106 monitors for signal strength in the readback signal to detect the hidden data. It will be noted that excessive variations in reflectivity in the manner set forth by FIG. 9 may result in a human detectable image on the disc, but slight variations will not be detectable by visual inspection of the disc.

Another embodiment of the present invention utilizes a symbol substitution scheme, a simple illustration of which is provided in FIG. 10. In this case, an original 12T symbol 186 in an original EFM+ signal 188 is replaced with a 5T, 2T, 5T sequence of symbols 190, 192 and 194 in a modified EFM+ signal 196. Error correction values are preferably calculated prior to this symbol substitution so that the sequence does not adversely affect playback of the disc 102.

The extraction engine 106 can readily detect the selected sequence and construct the plot 110 therefrom. It will be noted that the substitutionary sequence in FIG. 10 generally constitutes an illegal sequence and would thus tend to be readily detected by standard test equipment. However, other symbol substitution techniques using lawful sequences can readily be constructed, including the substitution of a first set of symbols for a second set of symbols. Sequences that rely on a second encoding scheme can also be employed such as disclosed in U.S. Pat. No. 6,487,155, assigned to the assignee of the present application.

The foregoing embodiments discussed thus far have utilized a pre-recorded disc, but such is not limiting. Rather, the various embodiments presented above can additionally be incorporated into recordable (blank) media, such as but not limited to DVD-R, DVD-R/W, etc. As will be recognized, such media generally incorporates pre-recorded data in the form of a wiggle pre-groove, which is frequency modulated to predetermine various aspects of the data including the locations of various sectors, etc.

Thus, in another embodiment recordable media can be provisioned with the hidden data in relation to adjustments to the characteristics of the wiggle pre-groove, such as by amplitude modulation. FIG. 11 provides a pre-groove signal 200 with a normal portion 202 and an enhanced portion 204. The pre-groove signal 200 is used to modulate the spiral track cut by the system 140 of FIG. 2 when the master disc 142 comprises a recordable master. The difference in amplitude modulation in the signal 200 can be selected so as to not affect the performance of the resulting recordable discs made therefrom. The extraction engine 106 is configured to monitor operation of the readback servo system (not shown) to detect the amplitude of the pre-groove and hence, construct the plot in relation thereto.

Figure 12:
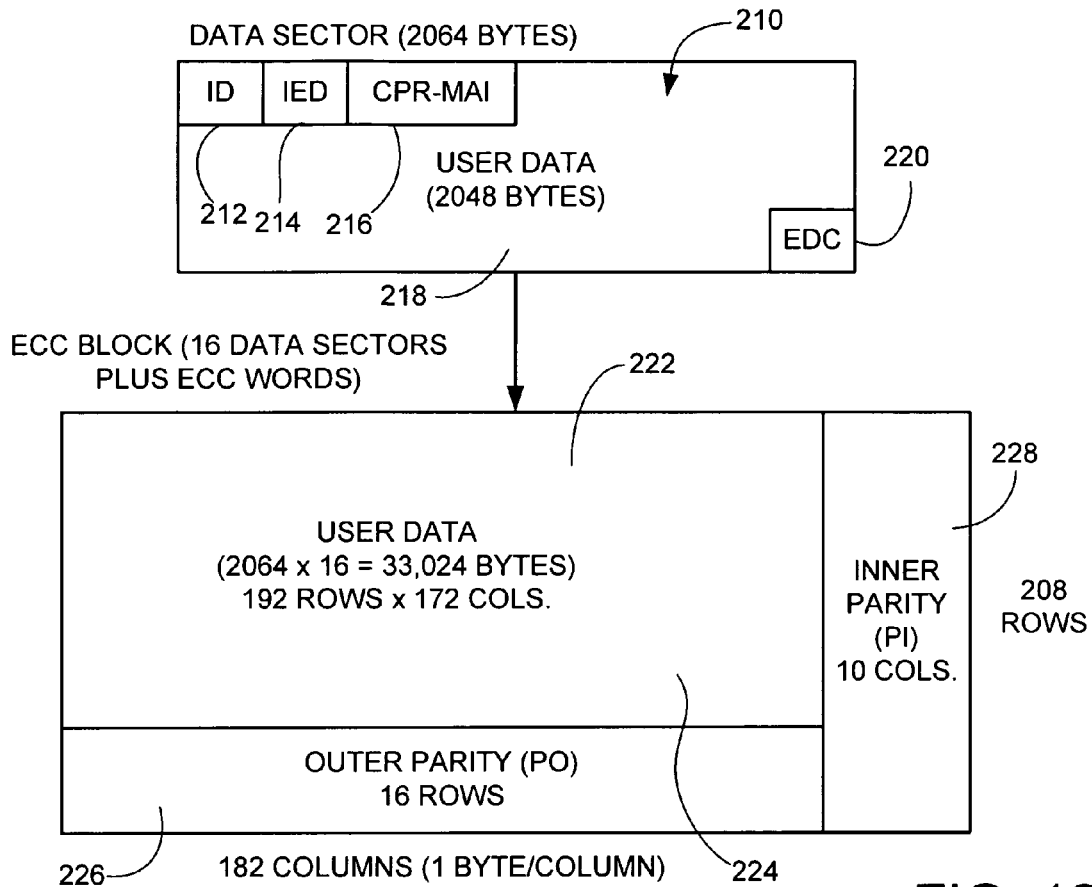
FIG. 12 generally sets forth a preferred manner in which data are arranged on the medium of FIG. 3.

Another access parameter that can be modified in accordance with preferred embodiments is error rate. FIG. 12 provides a diagrammatical representation of the general manner in which data are arranged on a DVD disc. Generally, the same overall format and data structure are used regardless of whether the DVD stores audio, video and/or computer software.

The basic block in a DVD is referred to as a 2064 byte data sector, as shown at 210. The data sector 210 includes a 4-byte identification (ID) field 212, a 2-byte ID error detection (IED) field 214, a 6-byte copyright management information (CPR-MAI) field 216, a 2048-byte user data field 218, and a 4-byte error detection code (EDC) field 220.

Each set of 16 consecutive data sectors 210 are grouped together into an error correction code (ECC) block 222 having 208 rows and 182 columns (one byte/column). The user data from the 16 data sectors 210 are interleaved into a user data block 224 (2064×16=33,024 bytes). Outer parity (PO) Reed Solomon correction codes are calculated for the columns of user data (as indicated at 226). Inner parity (PI) Reed Solomon correction codes are calculated for the rows of user data and PO codes (as indicated at 228). Using this scheme, an entire ECC block 222 must generally be retrieved during each disc access operation, even if only the contents of a single sector 210 are desired. On the other hand, this scheme provides a highly fault tolerant and compact format.

Current DVD specifications permit a relatively high number of read errors, such as a maximum of 280 read errors over eight consecutive sectors. Typical error rates have been found to generally be much lower, such as on the order of 8 to 10 read errors for eight sectors. Thus, further embodiments of the present invention can rely upon selectively induced errors in a non-random arrangement, such as represented in FIG. 13.

Figure 13:
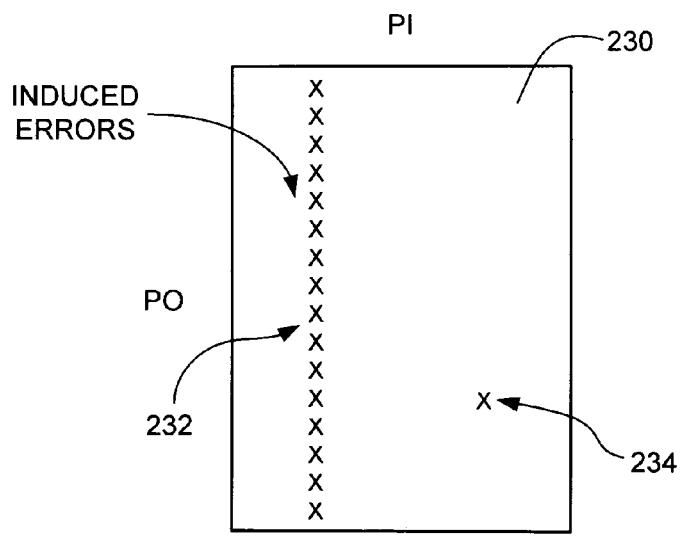
FIG. 13 shows a preferred use of induced errors to provide a human detectable image such as exemplified in FIG. 2.

FIG. 13 provides a matrix 230 corresponding to the ECC block 222 of FIG. 12 to represent the PO versus PI correction codes. Selectively inducing errors such as along a particular column can be used as a marker for the extraction engine 106, as depicted in FIG. 13 at 232. It will be noted that generally, induced errors are readily identifiable using standard test equipment, particularly if the induced errors are significant in number or grouping.

However, the hidden data can additionally, or alternatively, be induced such as by the placement of a single induced error in a particular location within the matrix 13, such as denoted at 234. Some noise from naturally occurring errors in these locations may interfere with the image, but the signal to noise ratio should be sufficient to allow ready visualization of the hidden data in the plot 110. The selective placement of a limited number of errors in this way should not degrade the performance of the disc to any measurable extent as far as the end user is concerned.

Figure 14:
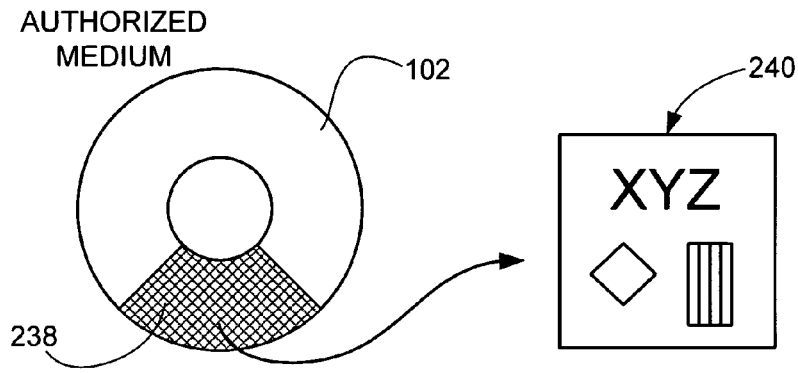
FIGS. 14 and 15 generally illustrate various ways in which different portions of the medium can be represented via the surface plot of FIG. 2.
Figure 15:
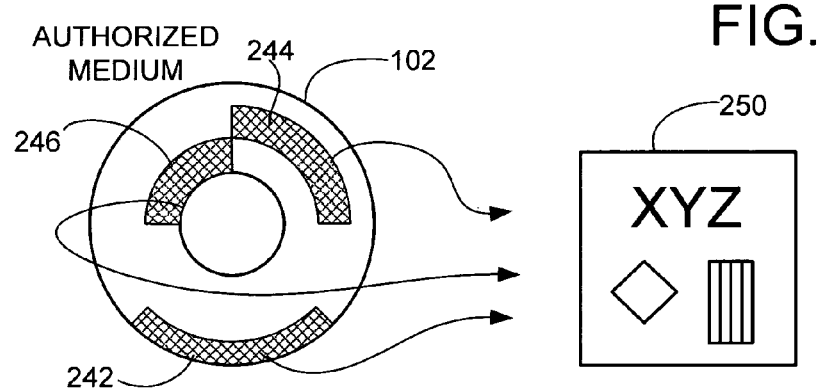

While an entire surface plot has been contemplated thus far, such is not necessarily required. For example, as shown by FIG. 14, an arcuate portion 238 of the disc is translated into a rectilinear surface plot 240. The extraction engine 106 maps angular coordinates from the disc into the Cartesian coordinates of the plot 240. Alternatively, a rectilinear surface plot 250 can be formed from discontinuous portions 242, 244, 246 of the disc 102, as depicted by FIG. 15. The entire surface plot 110 of FIG. 2 can also be formed from discontinuous portions of the disc as well, as desired.

It will be noted that individual access parameters have been contemplated thus far as forming the visually detectable information provided by the hidden data (e.g., adjustments in motor velocity, data bit rate, latency time, adjusted symbol length, illegal symbol length, localized reflectivity of the medium, variations in pre-groove amplitude, error rates, and/or localized induced errors, etc.). However, such is not necessarily required. Rather, two or more different access parameters can be combined to form the human detectable image.

For example, reflectivity characteristics can be used to supply a first value to certain locations within the plot 110, and error rates can be used to supply a second value to the same locations. Using an additive color system (e.g., a color monitor), red pixels can be added to green pixels to provide a yellow image, and so on. Using a subtractive color system (e.g., a laser printer), cyan pixels can be added to yellow pixels to provide a green image, and so on.

Alternatively, or additionally, some components (e.g., the first letter in a word, etc.) can be supplied by the first parameter and other components (e.g., the second letter in the word) can be supplied by the second parameter, and so on. In another embodiment, logical operators (such as an AND gate) can be used to logically combine the presence of two or more adjusted parameters for a selected pixel or other feature of the plot 110 in order to create the image. Using multiple parameters to form the image provides a level of redundancy and enhances the forensic value of the system, especially if some components are easily detected and others are not.

Figure 16:
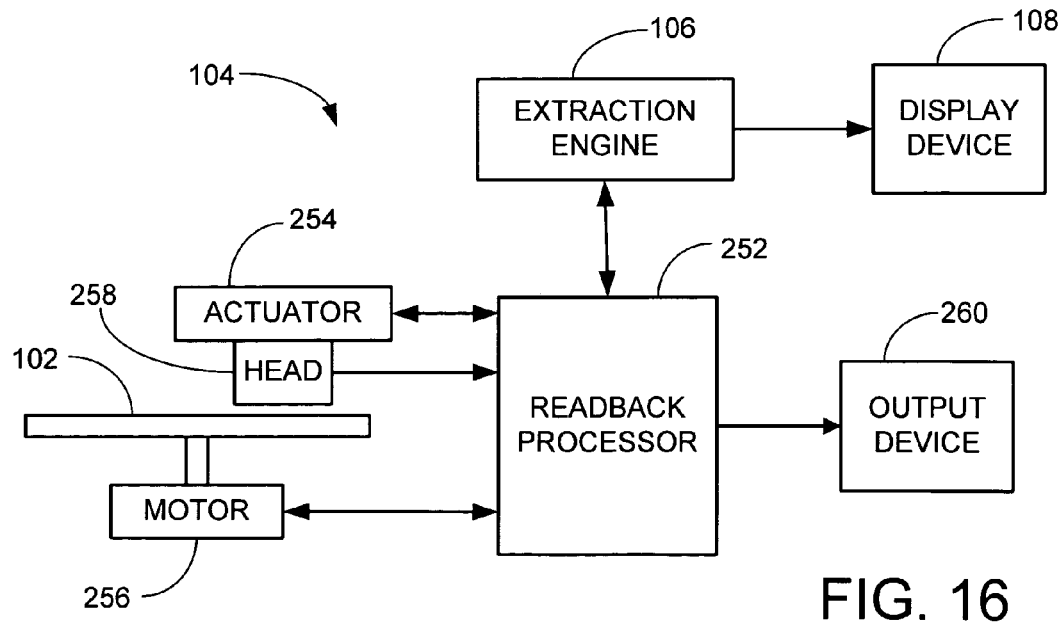
FIG. 16 provides a generalized functional block diagram of the readback system of FIG. 1.

FIG. 16 has been provided to illustrate additional details with regard to the readback system 104 of FIG. 1. Preferably, a conventional readback processor block 252 operates to control an actuator 254 and motor 256 to obtain a readback signal from a transducer head 258 (e.g., an optical pick-up). The readback processor operates to generate an associated output stream to an appropriate output device 260. For example, if the user data stored on the disc 102 constitutes video data, the output device can comprise a video monitor or the like; if the user data stored on the disc 102 constitutes computer (ROM) data, the output device can comprise a PC, etc.

The extraction engine 106 monitors the operation of the readback processor 252 in order to extract the hidden data during readback. As discussed above, the particular configuration of the extraction engine 106 will depend at least in part upon and can be readily constructed in view of the type of access parameter(s) used to encode the hidden data. Hidden data related to motor velocity will interface with motor control circuitry of the readback processor 252; hidden data related to symbol length will interface with decoder circuitry, etc. The extraction engine 106 can be hardware or processor based.

For purposes herein, the phrase "unaided visual inspection" and the like will be understood consistent with the foregoing discussion to mean direct physical inspection of the medium by a human eye (i.e., a human looking directly at the disc) without the use of additional intervening equipment such as but not limited to magnification, rectification, filtering or other analysis types of devices. The presence of an ambient light source, however, is necessarily presumed in order to enable the human to see the disc. Thus, those skilled in the art will readily understand that a human picking up and visually examining a disc or other medium under ambient light conditions will not be able to visually detect the presence of the hidden data.

The phrase "surface plot" and the like will be understood consistent with the foregoing discussion as a type of output whereby the associated data are plotted as one or more multi-dimensional surfaces, irrespective of whether the resulting plot directly corresponds to a selected physical surface of the medium.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. An apparatus comprising a data storage medium having an embedded recording layer to which is stored a first set of data characterized as a sequence of encoded data symbols arranged along concentric tracks on the medium each data symbol of nominally nT length where T is a channel clock rate and n is an integer, wherein a second set of data is selectively applied to at least selected ones of the data symbols of said sequence prior to being written to the recording layer to alter at least a selected one of said length, a width or a depth of each of the selected ones of the data symbols, wherein the second set of data is configured to adjust an access parameter of the medium, the second set of data characterized as hidden data such that the presence of the hidden data is undetectable to a human observer upon unaided visual inspection of the medium, wherein the second set of data is configured such that a surface plot of at least a portion of the medium renders visible the hidden data to authenticate the medium as an authorized copy, the surface plot generated by sequentially reading the data symbols in relation to the channel clock rate using a data transducer, extracting the second set of data therefrom and displaying the surface plot as an image of the medium on a graphical display device, and wherein the second set of data is further configured such that a playback device recovers the first set of data and forwards the recovered first set of data to an output device by reading the selected ones of the data symbols to which the second set of data have been applied.

2. The apparatus of claim 1, wherein the data storage medium comprises an optical disc.

3. The apparatus of claim 2, wherein the optical disc comprises a plurality of recording layers, and wherein the hidden data are arranged on each of said plurality of recording layers.

4. The apparatus of claim 1, wherein the optical disc is characterized as a digital versatile disc (DVD).

5. The apparatus of claim 1, wherein the data storage medium is characterized as a pre-recorded replicated disc formed from a master medium comprising a glass substrate.

6. The apparatus of claim 1, wherein the data storage medium is characterized as a recordable disc.

7. The apparatus of claim 1, wherein the selectively adjusted access parameter comprises an adjusted symbol length so that the adjusted symbols have a length along an associated track of the medium that deviates from the nominal nT length.

8. The apparatus of claim 1, wherein the first set of data is further modulated by a third set of data to selectively adjust a second access parameter of the medium, and wherein the surface plot provides a human discernable image formed from a combination of said second and third sets of data.

9. An apparatus comprising a write transducer, and a writing circuit which modulates the write transducer to write data to a data storage medium as the medium is rotated adjacent the write transducer, said written data comprising a first set of data expressed as a sequence of varying length data symbols each of nominally nT length where T is a channel clock rate and n is an integer, wherein a second set of data is selectively applied to the data symbols to alter at least a selected one of said length, a width or a depth of at least selected ones of the data symbols, the second set of data configured to adjust an access parameter of the medium, wherein the second set of data is characterized as hidden data such that the presence of the hidden data is undetectable to a human observer upon unaided visual inspection of the medium, and wherein the second set of data forms a visible human detectable image in a subsequently generated surface plot of at least a portion of the medium thereby authenticating the medium as an authorized copy, the surface plot generated by reading the sequence of data symbols using a first readback system in relation to the channel clock rate and extracting the second set of data therefrom to form a visual image of the medium on a display device, the apparatus further configured to write the first and second sets of data to the medium such that the first set of data is subsequently recoverable therefrom using a different, second readback system which reads the data symbols to which the second set of data has been applied as the medium is rotated adjacent a readback transducer and outputs the first set of data to an output device.

10. The apparatus of claim 9, wherein the writing circuit comprises a signal processing block which processes at least the first set of data, an encoder which generates a modulation signal in response to the signal processing block to modulate the transducer, and a control block which selectively controls movement of the transducer and the medium.

11. The apparatus of claim 9, wherein the medium is characterized as a master optical disc from which a population of replicated optical discs are subsequently formed.

12. The apparatus of claim 11, wherein each of said population of replicated optical discs comprises multiple recording layers, and wherein the apparatus distributes said hidden data to each of said plurality of recording layers.

13. The apparatus of claim 9, wherein the selectively adjusted access parameter is selected from a group consisting essentially of a motor velocity, a data bit rate, a latency time, an adjusted symbol length, an illegal symbol length, localized reflectivity, a pre-groove amplitude, an error rate, and localized induced errors.

14. The apparatus of claim 9, wherein said sequence of encoded data symbols include symbol lengths of at least 3T, 4T and 5T.

15. The apparatus of claim 9, wherein the second set of data are encoded using a first type of access parameter associated with variations in a length of the associated data symbol on the storage medium.

16. The apparatus of claim 9, wherein the second set of data are encoded using a first type of access parameter associated with radial variations of a track along which the associated data symbols are arranged on the storage medium.

17. The apparatus of claim 9, wherein the second set of data are encoded by inducing correctable errors in an associated bit sequence of the encoded data symbols.

18. A method comprising:
encoding a first set of data to provide a first sequence of variable length data symbols each of nominally nT length where T is a channel clock rate and n is an integer; and
generating an adjusted sequence of data symbols by selectively adjusting a length along the storage medium of at least selected ones of the data symbols in the first sequence to embed a second set of data in the data symbols so as to have a length that deviates from said nT length and writing the adjusted sequence of data symbols to a storage medium, wherein the second set of data comprises hidden data such that the presence of the hidden data is undetectable to a human observer upon unaided visual inspection of the medium, and wherein the second set of data forms a visible human detectable image in a subsequently generated surface plot of at least a portion of the medium thereby authenticating the medium as an authorized copy.

19. The method of claim 18, further comprising steps of generating said surface plot by transducing the adjusted sequence of data symbols in relation to the channel clock rate to generate at least one readback signal, extracting the second set of data from the at least one readback signal, and displaying the surface plot on a display device in relation to the extracted second set of data.

20. The method of claim 19, wherein the surface plot is assembled as a continuous image from discontinuous locations on the storage medium.

21. The method of claim 18, wherein the encoding step comprises inserting error correction codes in the first sequence configured to detect up to a selected number of bit errors in a recovered bit sequence, and wherein the second set of data comprises an intentional bit error detectable by said error correction codes.

22. The method of claim 18, wherein the second set of data are embedded in the form of two different types of access parameters associated with the readback of the adjusted sequence of data symbols, wherein said two different types of access parameters are combined to generate the surface plot.

23. An apparatus comprising a blank recordable optical disc on which a wiggle pre-groove is defined which circumferentially extends about the disc to form a plurality of concentric tracks, the wiggle pre-groove being frequency modulated to define locations of various sectors to which user data are subsequently written during a write operation to record data to the disc, wherein at least portions of the wiggle pre-groove are further amplitude modulated in relation to a set of hidden data to induce variations in radial position with respect to a track centerline of a readback servo system used to follow said wiggle pre-groove, wherein the presence of the hidden data is undetectable to the human eye during unaided visual inspection of the medium, and wherein the hidden data are configured such that a surface plot of said portions of the medium to which the amplitude modulated wiggle pre-groove portions renders visible the hidden data to authenticate the disc.

24. The apparatus of claim 23, wherein the blank recordable optical disc is characterized as a recordable DVD.

25. The apparatus of claim 23, wherein the hidden data forms a human discernable image in the surface plot, and said image comprises at least one alphanumeric character.

26. An apparatus comprising a data storage medium having an embedded recording layer to which data are stored in fixed sized sectors, the recording layer further storing error detection codes configured to enable a readback system to detect and correct errors in a readback signal transduced from said sectors, wherein at least one intentional error is induced in the recording layer that can be corrected by said error detection codes during a sequential readback of the sectors and which forms hidden data the presence of which is undetectable to the human eye during unaided visual inspection of the medium, and wherein the hidden data are configured such that a surface plot of at least a portion of the medium renders visible the hidden data to authenticate the disc, the surface plot generated by sequentially reading the data sectors using a data transducer, extracting the second set of data therefrom and displaying the surface plot as an image of the medium on a graphical display device.

27. The apparatus of claim 26, wherein the blank recordable optical disc is characterized as a recordable DVD.

28. The apparatus of claim 26, wherein the hidden data forms a human discernable image in the surface plot, and said image comprises at least one alphanumeric character.

* * * * *